US012066105B2

(12) United States Patent
Lee

(10) Patent No.: US 12,066,105 B2
(45) Date of Patent: Aug. 20, 2024

(54) GASKETS

(71) Applicant: KUK IL INNTOT CO. , LTD., Ulsan (KR)

(72) Inventor: Jong Chul Lee, Ulsan (KR)

(73) Assignee: KUK IL INNTOT CO. , LTD., Ulsan (KR)

( * ) Notice: Subject to any disclaimer, the term of this patent is extended or adjusted under 35 U.S.C. 154(b) by 0 days.

(21) Appl. No.: 17/771,603

(22) PCT Filed: Oct. 23, 2020

(86) PCT No.: PCT/KR2020/014622
§ 371 (c)(1),
(2) Date: Apr. 25, 2022

(87) PCT Pub. No.: WO2021/080390
PCT Pub. Date: Apr. 29, 2021

(65) Prior Publication Data

US 2022/0373087 A1 Nov. 24, 2022

(30) Foreign Application Priority Data

Oct. 24, 2019 (KR) ........................ 10-2019-0132715

(51) Int. Cl.
*F16J 15/10* (2006.01)
*F16J 15/02* (2006.01)
*F16J 15/12* (2006.01)

(52) U.S. Cl.
CPC ........... *F16J 15/104* (2013.01); *F16J 15/102* (2013.01); *F16J 15/022* (2013.01); *F16J 15/125* (2013.01)

(58) Field of Classification Search
CPC ........ F16J 15/102; F16J 15/104; F16J 15/125; F16J 15/022
See application file for complete search history.

(56) References Cited

U.S. PATENT DOCUMENTS 4,364,982 A * 12/1982 Gee ........................ F16L 23/18 277/610
5,082,296 A * 1/1992 Aizawa ................. F16J 15/125 277/610
5,161,807 A * 11/1992 Allen ..................... F16J 15/125 277/610
5,308,090 A * 5/1994 Hamada ................. F16J 15/125 277/609
5,511,797 A * 4/1996 Nikirk .................... F16J 15/122 277/609
5,683,091 A * 11/1997 Isoe ....................... F16J 15/125 277/610
5,823,542 A * 10/1998 Owen ..................... F16L 23/18 277/610

(Continued)

FOREIGN PATENT DOCUMENTS

JP 05-038465 U 5/1993
JP 2007-182948 A 7/2007

(Continued)

*Primary Examiner* — Nicholas L Foster
(74) *Attorney, Agent, or Firm* — NKL Law; Jae Youn Kim

(57) ABSTRACT

A gasket, and more particularly, to a gasket including a sealing material with grooves in a surface thereof and a filler provided between the sealing material are proposed. With the gasket, it is possible to secure higher airtightness, stability and restorability than gaskets of the related art.

10 Claims, 14 Drawing Sheets

(56) References Cited

U.S. PATENT DOCUMENTS

| | | | | | |
|---|---|---|---|---|---|
| 5,913,522 | A * | 6/1999 | Koch | F16L 23/20 277/610 |
| 8,505,922 | B2 * | 8/2013 | Henne | F16J 15/125 277/633 |
| 9,188,227 | B2 * | 11/2015 | Deluca | F16J 15/125 |
| 9,285,062 | B2 * | 3/2016 | Jenkins | F16L 23/167 |
| 10,107,400 | B2 * | 10/2018 | Lee | F16J 15/102 |
| 10,544,864 | B2 * | 1/2020 | Natori | F16J 15/108 |
| 10,591,063 | B2 * | 3/2020 | Yanagitake | F16J 15/104 |
| 10,955,055 | B2 * | 3/2021 | Evans | F16J 15/125 |
| 2009/0115139 | A1 * | 5/2009 | Jenkins | F16L 23/167 277/610 |
| 2012/0068415 | A1 * | 3/2012 | Deluca | F16J 15/125 277/633 |
| 2015/0123353 | A1 * | 5/2015 | Asakura | F16J 15/06 277/610 |
| 2016/0138718 | A1 * | 5/2016 | Lee | F16L 23/18 277/608 |
| 2018/0023706 | A1 * | 1/2018 | Natori | F16J 15/122 277/633 |
| 2019/0011048 | A1 * | 1/2019 | Yanagitake | F16J 15/125 |
| 2019/0011049 | A1 * | 1/2019 | Yanagitake | F16J 15/125 |

FOREIGN PATENT DOCUMENTS

| | | | |
|---|---|---|---|
| JP | 5997415 | B1 | 9/2016 |
| KR | 20-0410284 | Y1 | 3/2006 |
| KR | 10-2012-0016040 | A | 2/2012 |
| KR | 10-1367612 | B1 | 3/2014 |

* cited by examiner

GASKETS

TECHNICAL FIELD

The present disclosure relates to gaskets, and more specifically, a gasket provided between pipe flanges to maintain airtightness in a pipe.

BACKGROUND ART

A gasket is a general term for a static seal that is fastened through a bolt or the like at a fixed junction plane, e.g., a junction surface of a pressure vessel, a pipe flange or a machine/mechanism, so as to prevent leakage, and a form and material thereof may vary according to usage conditions, e.g., the type of working fluid, pressure, temperature, etc.

Initially, gaskets were simply manufactured using a material such as paper or leather but recently have been manufactured in various forms and using various materials as usage conditions are becoming complicated and severe. That is, a gasket is fitted between two tubular bodies, which are to be connected, to prevent leakage via a gap between the tubular bodies. For example, the gasket has a sealing function of not only preventing the leakage of a fluid but also preventing foreign substances from flowing into a tubular body, when interposed between flanges, which are connection parts, of a valve or the tubular body such as a pipe for transmission of a fluid. That is, when the gasket is fastened with valve or pipe flanges, a gap between the flanges, which are connection parts, is blocked from the outside when the gasket is compressed due to pressure applied thereto in an axial direction.

A gasket actually mounted and used in a plant is likely to be damaged under harsh conditions such as a high temperature and high pressure, and thus an accident may occur. Therefore, there is a need for a gasket capable of securing airtightness and having high stability and durability.

PRIOR ART LITERATURE

Patent Document

Korean Patent Registration 10-1367612 (registration date: Feb. 20, 2014)

Korean U.M. Registration No. 020-0410284 (registration date: Feb. 27, 2006)

DISCLOSURE

Technical Problem

The present disclosure is directed to providing a gasket capable of securing airtightness even in a harsh environment, such as a high-temperature, and high-pressure environment and having high stability and durability.

Technical Solution

To address the above-described problem, the present disclosure provides a gasket including a ring-shaped sealing member formed by winding a belt-shaped sealing material and a filler provided between overlapping portions of the wound sealing material, wherein a plurality of grooves are engraved in a surface of the sealing material.

Advantageous Effects

According to the present disclosure, the airtightness of the inside of a pipe can be secured using a sealing member having a fish-bone shape.

According to the present disclosure, the airtightness and stability of the sealing member can be improved using a filler.

According to the present disclosure, the sealing member can be easily manufactured due to grooves formed in a sealing material.

In addition, according to the present disclosure, additional sealing may be provided using a second sealing member, thereby reducing an accident rate due to leakage.

BEST MODE

Figure 1:
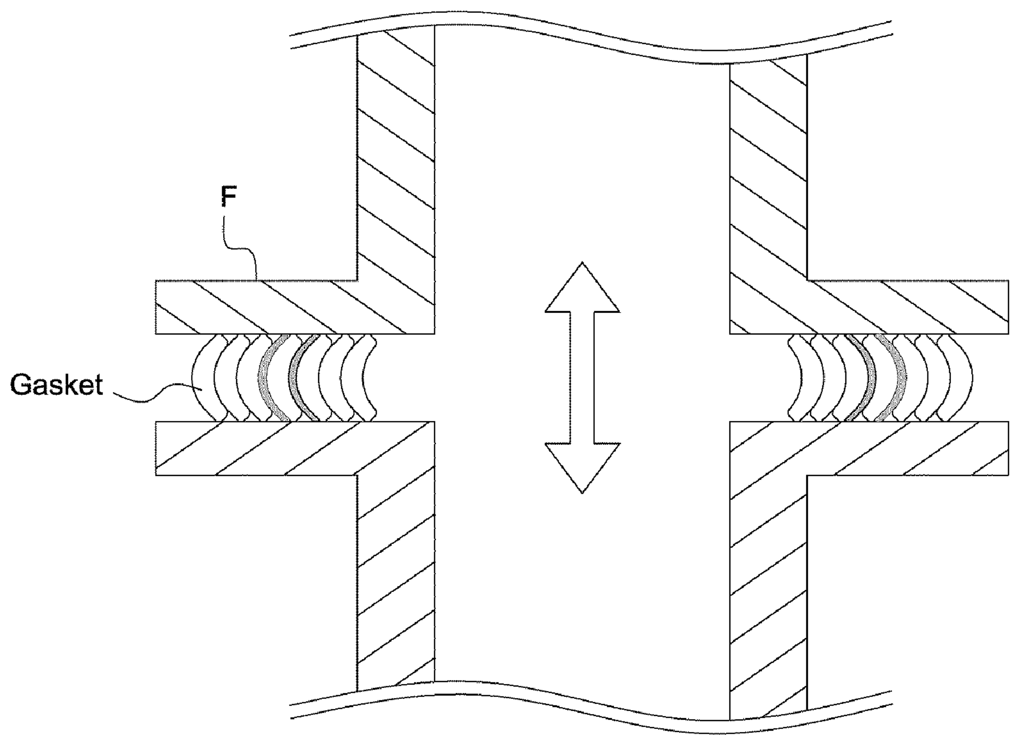
FIG. 1 is a cross-sectional view of a gasket installed in a pipe according to an embodiment of the present disclosure.

A gasket, for maintaining airtightness in a pipe, may include a first sealing member (100) having a ring shape and formed by winding a belt-shaped sealing material and a filler (150) provided between overlapping portions of the wound sealing material, wherein a plurality of grooves (110) are engraved in a surface of the sealing material.

Modes of the Invention

Hereinafter, terms used herein will be briefly described and an embodiment of the present disclosure will be described in detail. In the present specification, general terms that are currently widely used are selected, when possible, in consideration of functions in the present disclosure, but non-general terms may be selected according to the intentions of those skilled in the art, precedents, or new technologies, etc. Some terms ay be arbitrarily chosen by the present applicant. In this case, the meanings of these terms will be explained in corresponding parts of the present disclosure in detail. Accordingly, the terms used herein should be defined not based on the names thereof but based on the meanings thereof and the whole context of the present disclosure.

In the present specification, an "inner side" should be understood to include a direction toward a central axis of a component that is in the form of a band, and an "outer side" should be understood to include a direction away from the central axis. An "upper side" should be understood to include an upward direction in a drawing and a "lower side" should be understood to include a downward direction in the drawing.

Embodiments of the present disclosure will be described in detail below with reference to the accompanying drawings.

Figure 2:
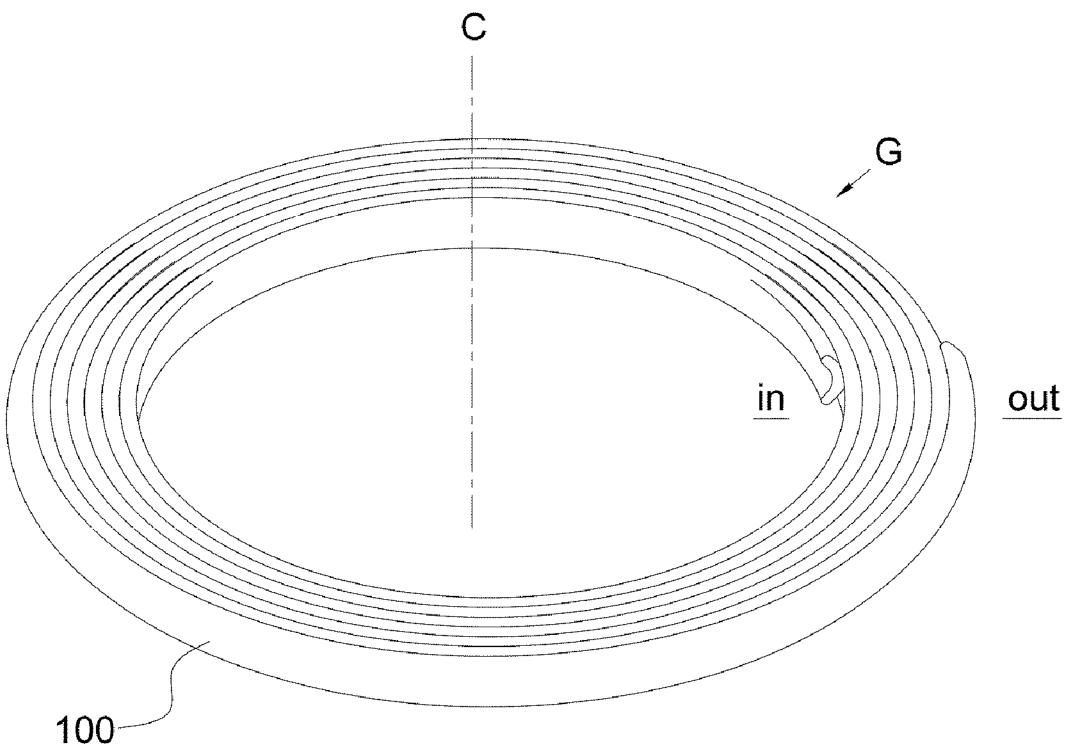
FIG. 2 is a perspective view of a gasket according to an embodiment of the present disclosure.

FIG. 1 is a cross-sectional view of a gasket installed in a pipe according to an embodiment of the present disclosure. FIG. 2 is a perspective view of a gasket G according to an embodiment of the present disclosure.

Referring to FIGS. 1 and 2, the gasket G according to the present disclosure may be provided between flanges F to maintain airtightness in a pipe and may be provided in various shapes, such as a circular shape, an oval shape, a quadrangular shape and a diamond shape, according to a shape of the flanges F or the pipe. In the present disclosure, an example in which the gasket G has a circular shape will be described.

An insulating gasket according to a first embodiment of the present disclosure includes a first sealing member 100 having a ring shape.

The first sealing member 100 may have a ring shape and have a fish-bone-shaped cross section. Specifically, the first sealing member 100 may be formed with multiple folds of protrusions protruding to a certain height from upper and lower surfaces thereof in a circumferential direction. More specifically, the protrusions of the first sealing member 100 may have a certain degree of curvature so that protruding ends of the protrusions may be bent toward a center or central axis direction of the first sealing member 100. In detail, the protrusions of the first sealing member 100 may have a having a ")"-shaped cross section because ends of the protrusions face the center of the gasket G. Here, the central axis of the first sealing member 100 refers to the same axis as the central axis of the gasket G and is a linear axis that coincides with a center of an annulus having a circular shape. More specifically, an end of each of the protrusions on the upper and lower surfaces of the first sealing member 100 is bent toward the center of the first sealing member 100 having a circular shape to face the center of the first sealing member 100 and thus a middle part of the first sealing member 100 between the protrusions may have an outwardly convex cross section with respect to the center of the gasket G.

Figure 3A:
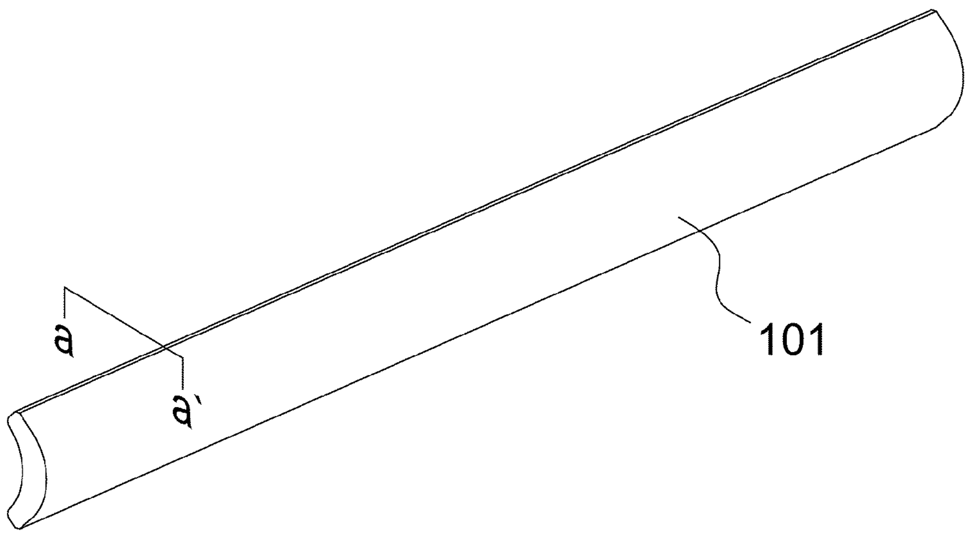
FIGS. 3A-3B illustrate a sealing material according to an embodiment of the present disclosure.
Figure 3B:
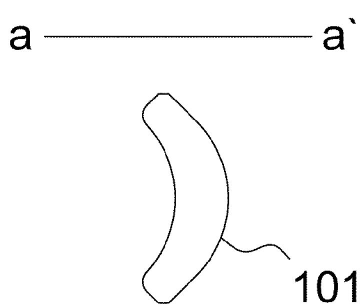

The first sealing member 100 having a fish-bone-shaped cross section as described above may be formed by winding a belt-shaped sealing material. In detail, the first sealing member 100 may be manufactured by winding a belt-shaped sealing material 101 having a ")"-shaped cross section. FIGS. 3A-3B illustrate a sealing material 101 according to an embodiment of the present disclosure. FIG. 3A is a diagram illustrating the sealing material 101 before being wound, and FIG. 3B is a cross-sectional view of the sealing material 101 taken along line a-a'. Specifically, the first sealing member 100 having a fish-bone shape may be manufactured by winding the sealing material 101 having a ")"-shaped cross section about an axis on a plane to form multiple folds (see FIG. 2). Thus, load on the flanges F may be concentrated on the protrusions of the first sealing member 100, thus greatly increasing the airtightness of the first sealing member 100. The first sealing member 100 is bent to a certain degree of curvature toward the central axis to prevent the first sealing member 100 from being moved away from the flanges F or being deformed due to pressure of a fluid flowing through the flanges F or the pipe. In detail, because the protruding ends of the protrusions are inwardly bent toward the central axis, the movement or deformation of the protrusions due to the fluid rather than a surface on which the protrusions and the flange F are in contact with each other may be prevented when the fluid in the pipe under relatively high pressure flows to the outside, thereby increasing the lifetime of the gasket G. Here, the sealing material 101 may be a material that maintains excellent compressibility and restorability under conditions such as high pressure and high temperature. For example, the sealing material 101 may be stainless steel, Inconel or the like. In detail, the sealing material 101 may be stainless steel 347, Inconel 825 or the like. A surface of the first sealing member 100 may be coated with a ceramic. In detail, when the surface of the first sealing member 100 is coated with a ceramic, an insulating property of the gasket G may be secured.

Figure 4A:
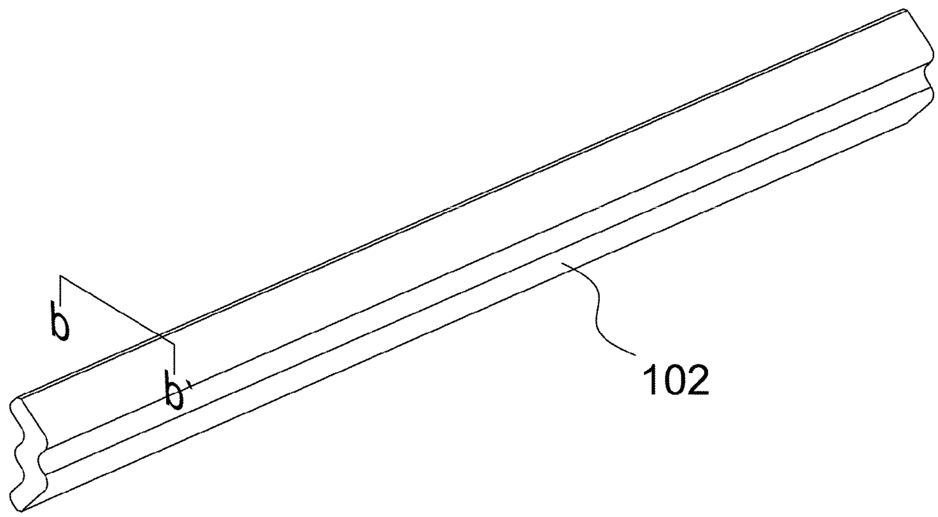
FIGS. 4A-4B illustrate a sealing material according to another embodiment of the present disclosure.
Figure 4B:
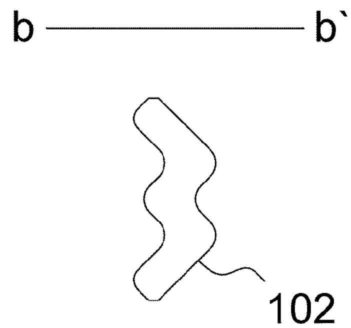

FIGS. 4A-4B illustrate a sealing material 102 according to another embodiment of the present disclosure. In detail, the first sealing member 100 may be manufactured by spirally winding a belt-shaped sealing material 102 having a W-shaped cross section. FIG. 4A is a diagram illustrating the sealing material 102 before being wound, and FIG. 4B is a cross-sectional view of the sealing material 102 taken along line b-b'. The elasticity of the sealing material 102 having the W-shaped cross section is higher due to the structure thereof compared to the sealing material 101 having the ")"-shaped cross section. Thus, the airtightness between the flange F and the first sealing member 100 may be improved. In addition, pressure applied from the fluid may be distributed, thereby improving durability. Furthermore, the sealing material 102 having the W-shaped cross section may be more firmly wound than the sealing material 101 which is a general sealing material, thereby reducing a breakage rate. In another embodiment of the present disclosure, the sealing material 102 may be provided to have a "<"-shaped cross section. The sealing material 102 having the above-described cross section may contribute to more easily distribute pressure and load than a general sealing material, thereby improving durability.

Figure 5A:
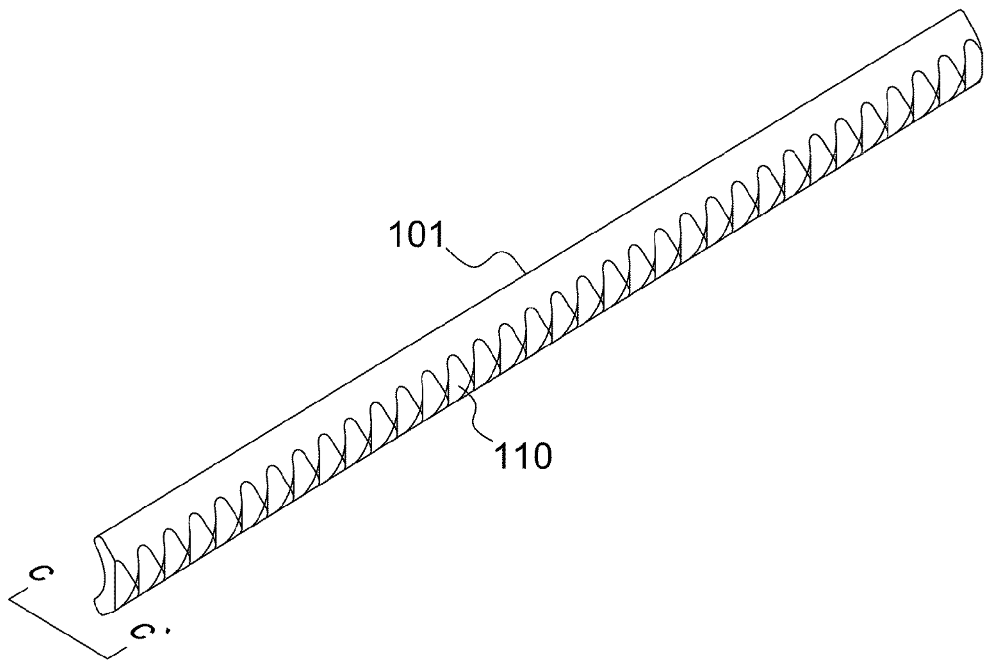
FIGS. 5A-5B illustrate grooves formed in a sealing material and each having a ")"-shaped cross section.
Figure 5B:
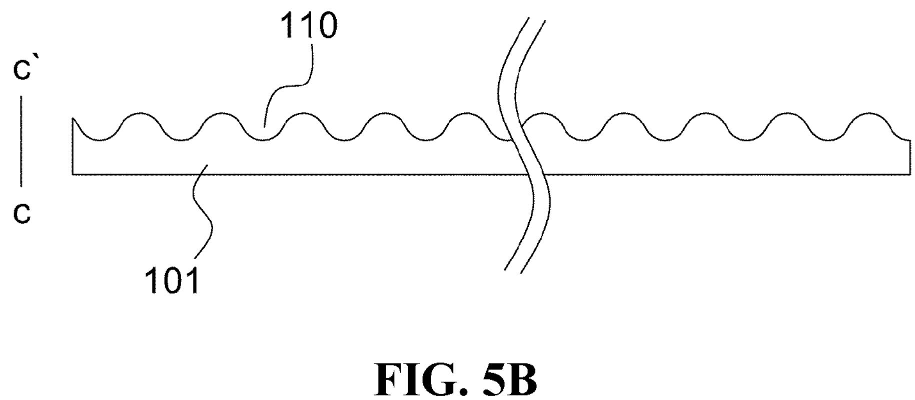
Figure 6A:
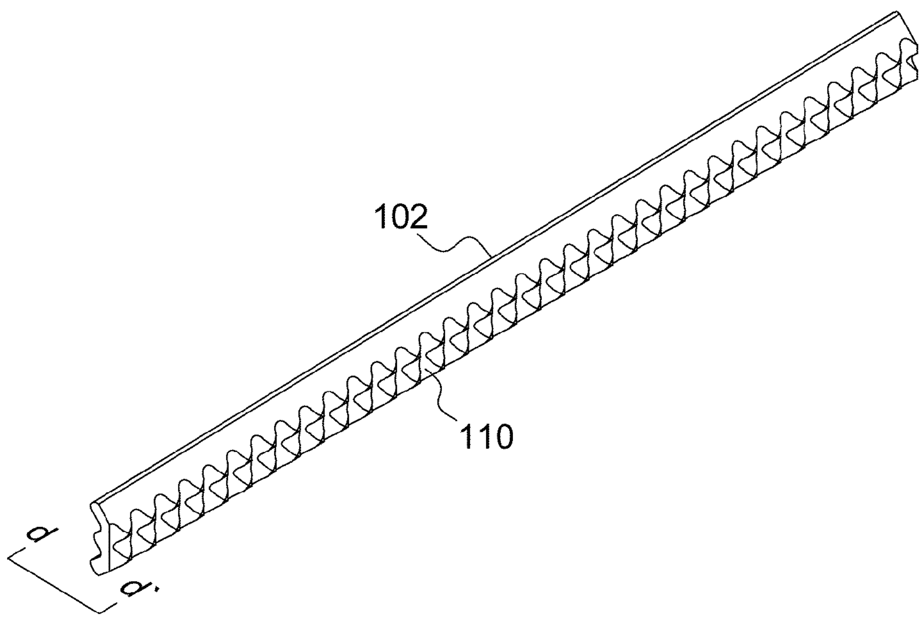
FIGS. 6A-6B illustrate grooves formed in a sealing material and each having a W-shaped cross section.
Figure 6B:
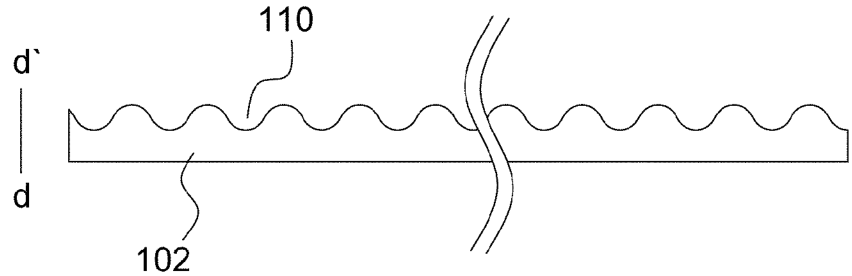

Referring to FIGS. 5A-5B and 6A-6B, grooves 110 may be engraved in a surface of each of the sealing materials 101 and 102. FIG. 5A is a perspective view of a sealing material 101 with grooves 110 having a ")"-shaped cross section, and FIG. 5B is a cross-sectional view taken along line c-c'. FIG. 6A is a perspective view of a sealing material 102 with grooves 110 having a W-shaped cross section, and FIG. 6B is a cross-sectional view taken along line d-d'. In detail, the grooves 110 are formed in a vertical direction. The grooves 110 may be formed by engraving 1 in a direction perpendicular to a plane about which the sealing members 101 or 102 are wound. A contact area between the first sealing member 100 and a filler 150 to be described below is increased by forming the grooves 110. Thus, the first sealing member 100 and the filler 150 may be firmly coupled to each other. Therefore, airtightness may be improved, and the sealing material 101 or 102 may be prevented from being unwound, thereby improving stability. In addition, a load applied on the sealing material 101 or 102 from the flange F may be distributed, thereby improving the strength of the sealing material 101 or 102. Furthermore, the sealing material 101 or 102 may be easily wound due to the grooves 110.

Alternatively, the grooves 110 may be provided in a “<” shape. Specifically, the grooves 110 may be provided to have a “<”-shaped cross section so that upper and lower sides thereof may form a certain angle with respect to the center of the sealing material 101 or 102. In this case, a contact area between the filler 150 and the first sealing member 100 may greatly increase, thus strengthening the coupling of the filler 150 and the first sealing member 100 and distributing the load on the grooves 110 in the vertical direction.

Figure 7A:
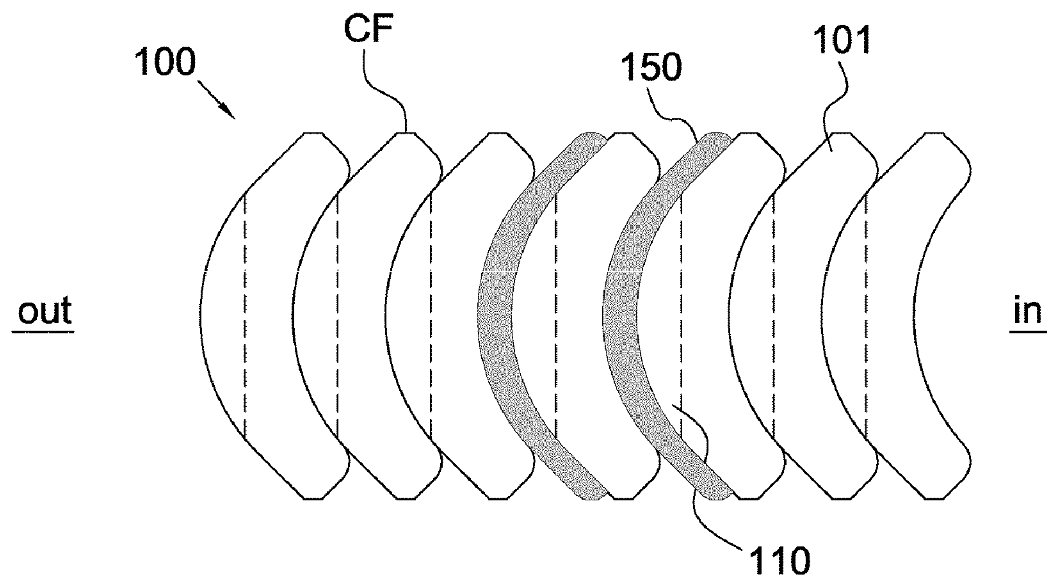
FIGS. 7A-7B and 8A-8B are cross-sectional views illustrating a first sealing member according to a first embodiment of the present disclosure.
Figure 7B:
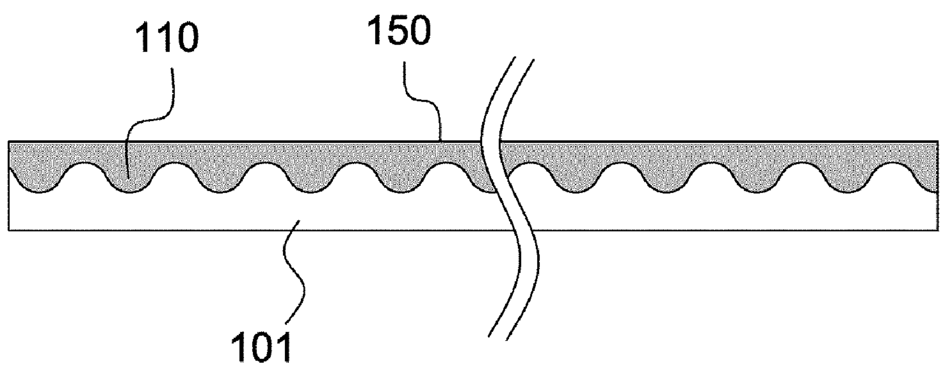
Figure 8A:
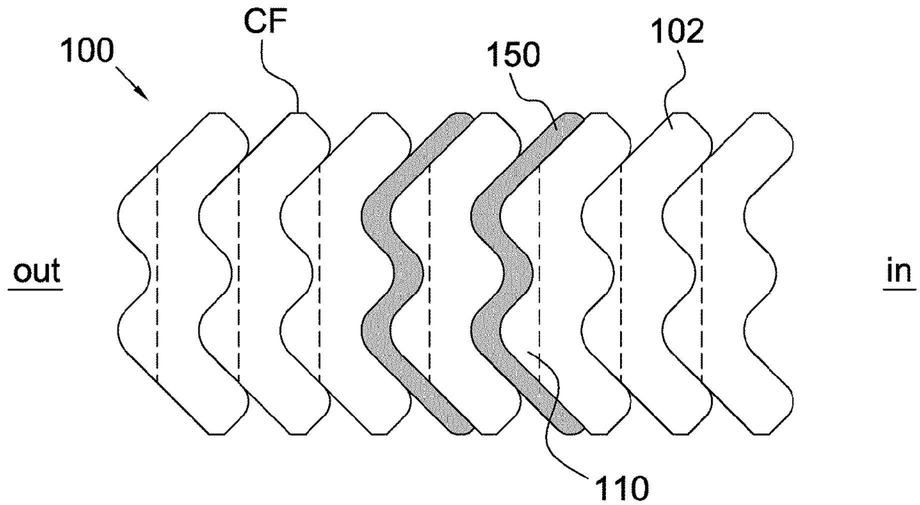
Figure 8B:
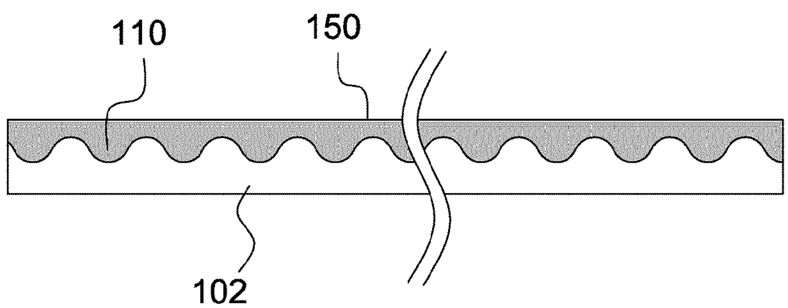

FIGS. 7A-7B and 8A-8B are cross-sectional views of examples of a first sealing member according to a first embodiment of the present disclosure. FIG. 7A and FIG. 8A are cross-sectional views of the first sealing member 100, and FIG. 713 and FIG. 8B are cross-sectional views of a fold of the first sealing member 100 as shown in FIGS. 5 and 6.

The filler 150 is configured to be provided between overlapping portions of the wound sealing material 101 or 102 to bond the sealing material 101 or 102 and prevent leakage of a fluid in a direction in which the sealing material 101 or 102 is wound. Specifically, because the first sealing member 100 is formed by winding the sealing material 101 or 102, there may be a gap between folds of the sealing material 101 or 102. Therefore, the fluid may leak in a direction in which the sealing material 101 or 102 is wound even when the airtightness of an interface between the first sealing member 100 and the flange F is secured. To prevent this problem, the filler 150 is provided between the folds of the sealing material 101 or 102 to bond the folds of the sealing material 101 or 102 and fill a gap. Therefore, the airtightness of the gasket G is improved. Preferably, the filler 150 may be formed of graphite. The insulating property of the gasket G may be improved when the filler 150 is formed of graphite. A load applied to the gasket G may be easily distributed due to the elasticity of the graphite. In addition, the adhesion between the first sealing member 100 and the filler 150 may increase, thereby increasing durability.

Upper and lower ends of the sealing material 101 or 102 may be each provided with a planar part CF. Specifically, the upper and lower ends of the sealing material 101 or 102 are chamfered horizontally to form the planar part CF. When the planar part CF is provided, a contact area between the first sealing member 100 and a layer 200 may increase, thereby improving the airtightness of the gasket G. Here, the planar part CF may not only be chamfered but also rounded. In this case, the airtightness of the gasket G may be improved, and an excessively large force may be prevented from being applied to the other components, thereby greatly improving durability.

Figure 9:
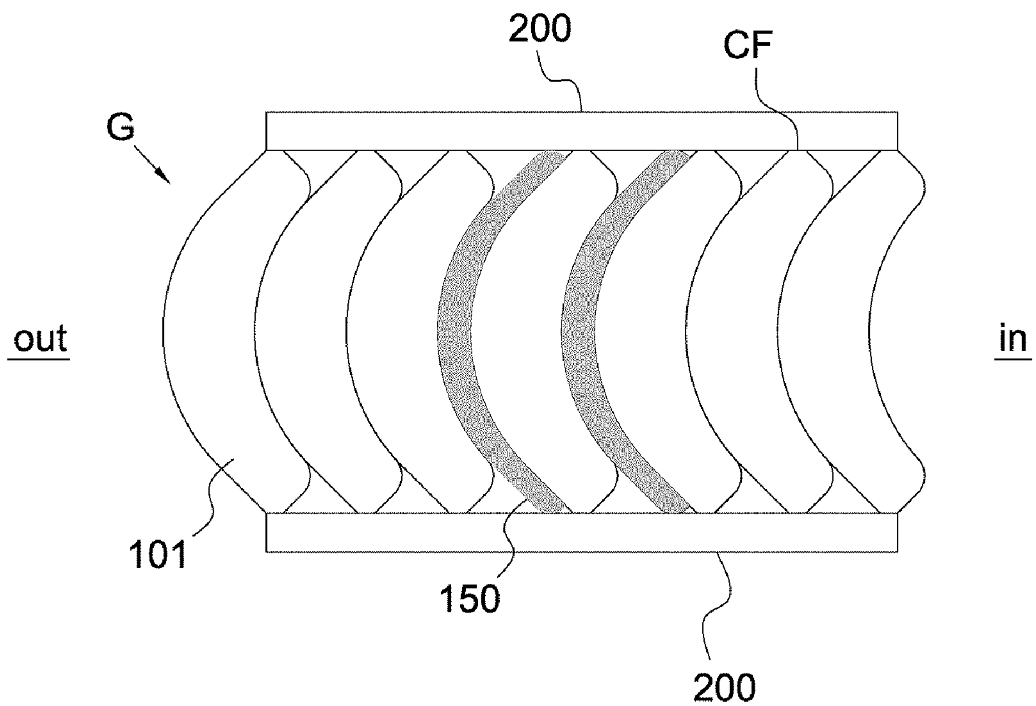
FIGS. 9 and 10 are cross-sectional views illustrating a layer according to an embodiment of the present disclosure.
Figure 10:
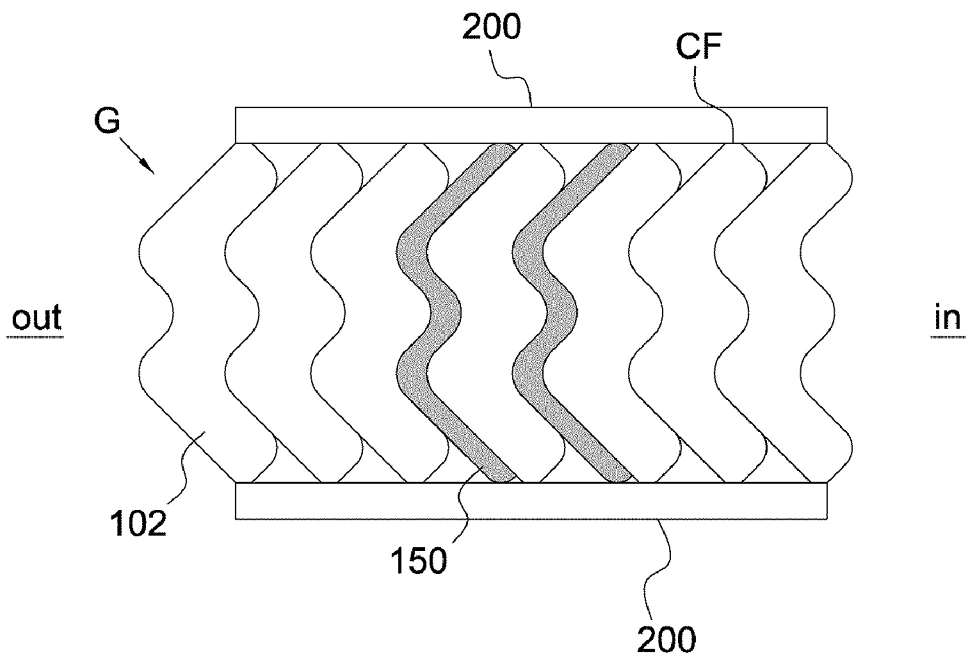

Alternatively, the layer 200 formed of graphite may be further provided on upper and lower surfaces of the gasket G to improve the airtightness of the gasket G (see FIGS. 9 and 10). In detail, the upper and lower surfaces of the gasket G may be brought into contact with the flange F through the layer 200 on the upper and lower surfaces of the gasket G. When the layer 200 is further provided, it is possible to prevent a fine gap between the gasket G and the flange F. Accordingly, the airtightness of the gasket G is improved. In addition, the weight of the flange F may be easily supported by the gasket G due to the elasticity of the layer 200. Therefore, the lifetime of the gasket G may be improved. The layer 200 may be formed of a material such as polytetrafluoroethylene (Teflon®), graphite, mica or the like.

Figure 11:
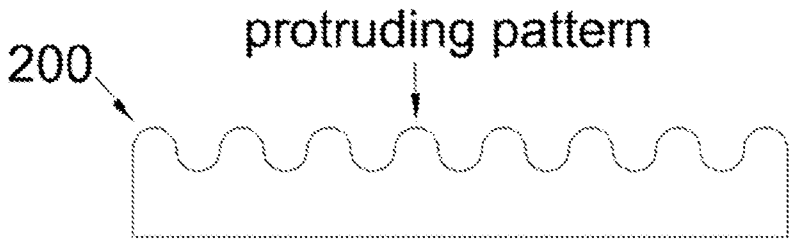
FIG. 11 illustrates an upper or lower surface of a layer according to another embodiment of the present disclosure.

Referring to FIG. 11, an upper or lower surface of a layer 200 according to another embodiment of the present disclosure may be provided with a protruding pattern. Specifically, the protruding pattern may be engraved in or embossed on the upper or lower surface of the layer 200 according to another embodiment of the present disclosure and thus peaks of the layer 200 may have a pointed corrugated cross section. The layer 200 that is of a gathering type as described above may contribute to increasing the adhesion between the gasket G and the flange F, thereby increasing airtightness.

FIG. 12 is a cross-sectional view of a gasket according to a second embodiment of the present disclosure.

Figure 12A:
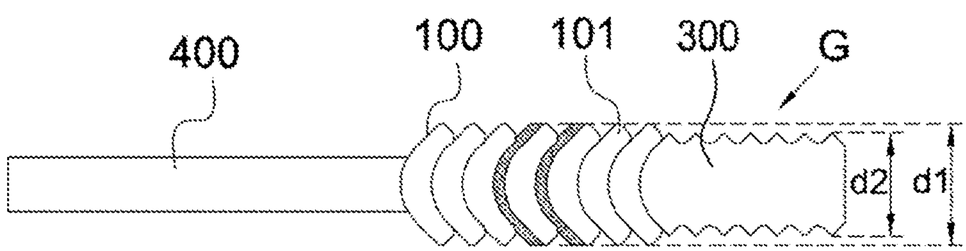
FIGS. 12A-12B are cross-sectional views of a gasket according to a second embodiment of the present disclosure.
Figure 12B:
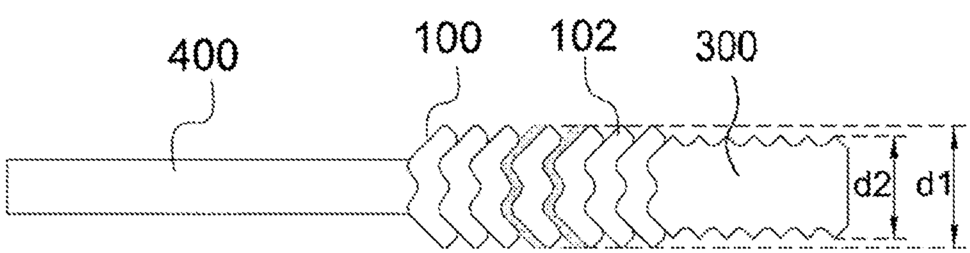
Figure 13A:
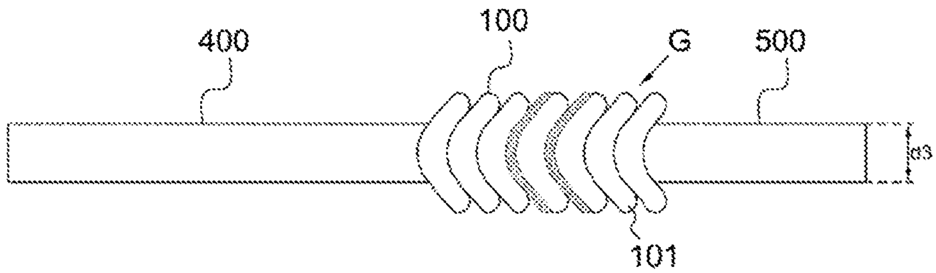
FIGS. 13A-13B are a cross-sectional views of a gasket according to a third embodiment of the present disclosure.
Figure 13B:
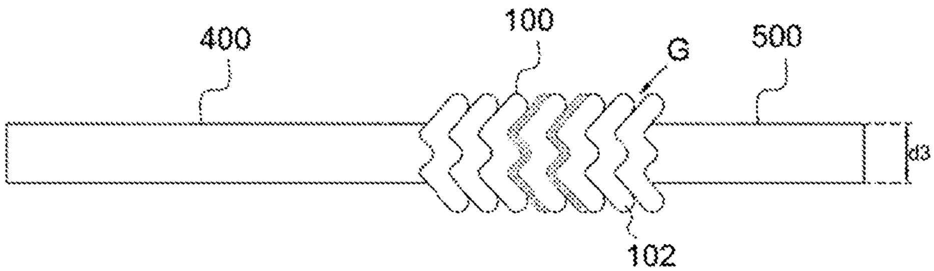

Referring to FIGS. 12A-12B, a second sealing member 300 may be further provided on an inner side of a first sealing member 100. Specifically, the second sealing member 300 is provided in a ring form, an upper surface and a lower surface thereof are provided with a sawtooth pattern, and is located on the inner side surface of the first sealing member 100. The second sealing member 300 additionally provides airtightness and distributes a load applied to the first sealing member 100 from the flange F. Accordingly, the airtightness and durability of the gasket G are improved. Even when the first sealing member 100 is damaged, the second sealing member 300 may prevent leakage of a fluid, thereby improving the stability of the gasket G. Preferably, the first sealing member 100 may have a first height D1, and the second sealing member 300 may have a second height D2 lower than the first height D1. Because the first sealing member 100 is provided to be higher than the second sealing member 300, the airtightness of the first sealing member 100 may be easily achieved and the second sealing member 300 may provide additional airtightness and distribute the load applied to the first sealing member 100. Alternatively, the second sealing member 300 may be provided on not only the inner side of the first sealing member 100 but also an outer side of the first sealing member 100.

According to a third embodiment of the present disclosure, an outer ring 400 may be provided on an outer side of the gasket G. The outer ring 400 may be formed in a ring shape along the outer side of the gasket G. Specifically, the outer ring 400 may be formed to protrude along an outer circumferential surface of the gasket G and may be in the form of a wheel, ring or frame. The outer ring 400 prevents the sealing material 101 or 102 from being unwound. In detail, the outer ring 400 is formed to cover the outer side of the sealing material 101 or 102 to prevent the sealing material 101 or 102 from being unwound in an outward direction. In addition, the gasket G between the flanges F may be guided through the outer ring 400 to be accurately placed at a desired position between the flanges F. In detail, the flanges F may be fastened with each other through a bolt, a nut, etc. that are arranged in a circumferential direction. Here, the gasket G may be accurately placed at the desired position between the flanges F by bringing an outer side of the outer ring 400 into contact with an outer side of the bolt, which passes through the flanges F, in an inward direction. As another example, the outer ring 400 may be provided with a groove through which a bolt may pass and thus the gasket G may be accurately guided to the desired position by inserting a bolt through the groove. As another example, the outer ring 400 may be provided with a semi-circular or arc-shaped groove, and the gasket G may be accurately guided to the desired position by placing the outer side of the bolt passing through the flanges F on a side of the semi-circular or arc-shaped groove. Therefore, through the outer ring 400, the gasket G may be fixed on the desired position without deviating from a sealing position.

In addition, an inner ring 500 may be provided on an inner side of the gasket G. The inner ring 500 may be formed in a ring shape along the inner side of the gasket G. Specifically, the inner ring 400 may be formed to protrude along an inner circumferential surface of the gasket G, and may be in the form of a wheel, ring or frame. The inner ring 500 prevents the sealing material 101 or 102 from being unwound. In detail, the inner ring 500 is formed to support the inner side of the sealing material 101 or 102 to prevent the sealing material 101 or 102 from being unwound in a direction of the inner side. The sealing material 101 or 102 may be prevented from being unwound by limiting a space in which the wound sealing material 101 or 102 is placed through the outer ring 400 and the inner ring 500, thereby stably maintaining the gasket G according to the present disclosure.

A gasket G according to a fourth embodiment of the present disclosure includes a first sealing member 100, a second sealing member 300, an outer ring 400, and an inner ring 500. That is, the fourth embodiment is a combination of the second embodiment employing the first sealing member 100 and the second sealing member 300 and the third embodiment employing the outer ring 400 and the inner ring 500. According to the fourth embodiment, stability may be greatly improved by adding the outer ring 400 and the inner ring 500 to the gasket G employing the first sealing member 100 and the second sealing member 300. In this case, the outer ring 400 or the inner ring 500 preferably has a third height D3 a the second height D2 of the second sealing member 300.

According to a fifth embodiment of the present disclosure, an O-ring 600 may be provided on an outer side of the gasket G. In detail, the O-ring 600 may be formed along an outer circumferential circumference of the gasket G and have a circular cross section. The O-ring 600 prevents the sealing material 101 or 102 from being unwound, similar to the inner ring 500 described above. In addition, the restorability and sealability of the gasket G may be improved owing to the O-ring 600. Specifically, the restorability and sealability of the gasket G may be improved due to self-energizing of the O-ring 600. The self-energizing will be described in detail below. When internal pressure of a pipe increases, the sealing material 100 that may expand when exposed to a fluid and the O-ring 600 are compressed against each other to be in close contact with each other, thus increasing the adhesion between the O-ring 600 and the flanges F. As such, the self-energizing is a function of adaptively operating the O-ring 600 to the internal pressure in the pipe.

In addition, a core spring may be provided in the O-ring 600. The core spring provides yield strength to the gasket G, thereby improving the restorability of the gasket G.

A gasket G according to a sixth embodiment of the present disclosure includes a first sealing member 100, a second sealing member 300, an outer ring 400, and an O-ring 600 as described above. That is, the O-ring 600 is applied to the sixth embodiment instead of the inner ring 500 of the fourth embodiment. According to the sixth embodiment, the airtightness and restorability are higher due to the O-ring 600 than those of the gasket G according to the fourth embodiment.

Figure 14:
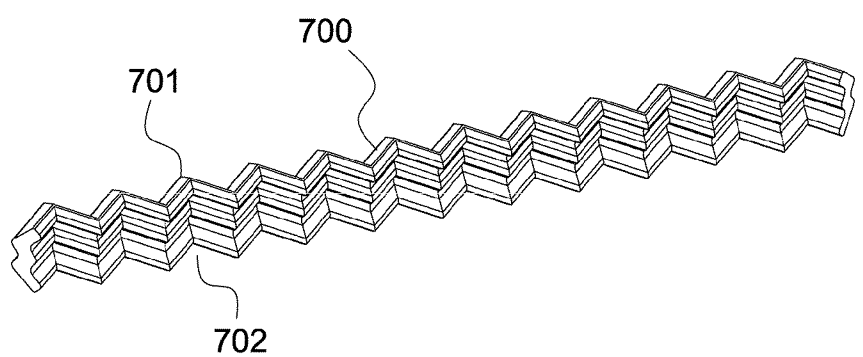
FIG. 14 illustrates a third sealing member according to another embodiment of the present disclosure.
Figure 15:
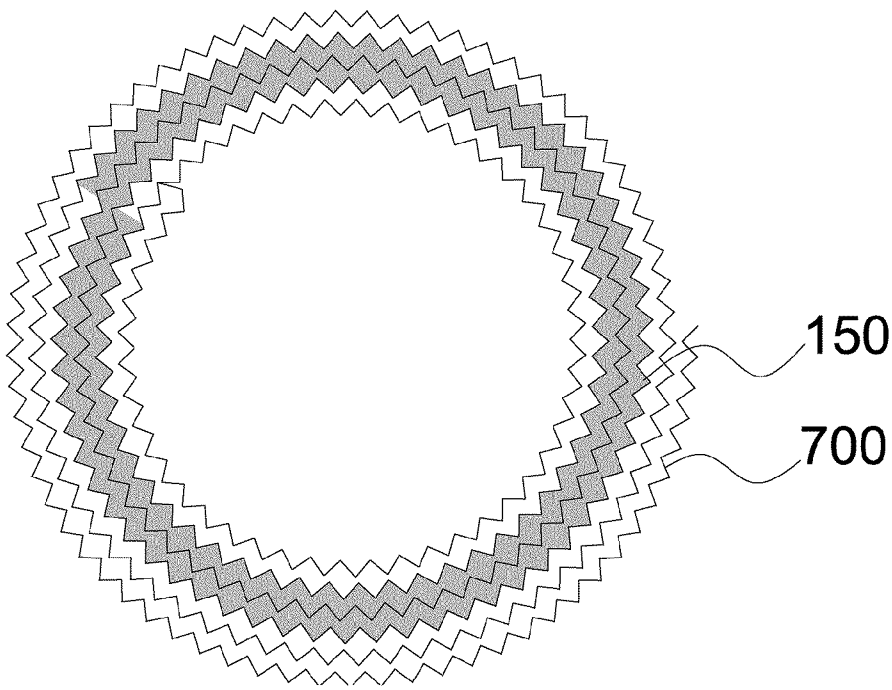
FIG. 15 illustrates a third sealing member according to another embodiment of the present disclosure.

FIGS. 14 and 15 are diagrams illustrating a sealing material according to other embodiments of the present disclosure.

According to another embodiment of the present disclosure, a third sealing member 700 is further provided. The third sealing member 700 is provided to perform the same function as the first sealing member 100 described above. To this end, the third sealing member 700 is formed by winding a belt-shaped sealing material in a zig-zag form to be folded. That is, the third sealing part 700 is wound in the form of being embossed or engraved in an outward direction or an inward direction about the central axis of the gasket (G). Accordingly, the third sealing member 700 is provided in a ring shape such that each peak portion 701 comes into contact with a valley portion 702 adjacent thereto in an outward or inward direction when the third sealing member 700 is folded. The gasket G may be more easily wound due to the third sealing member 700, the peak portions 701 and the valley portions 702 of which are engaged with each other when wound, and may be continuously maintained in a wound state. As shown in FIGS. 14 and 15, a cross section of the third sealing member 700 may have a “)” shape, a “>” shape, or the like, as well as a w-shape.

The above-described embodiments of the present disclosure are intended for the purpose of illustration, and various modifications, changes and additions may be made by those of ordinary skill in the art within the spirit and scope of the present disclosure. Such modifications, changes, and additions should be understood to fall within the scope of the present disclosure.

Various replacements, modifications and changes may be made by those of ordinary skill in the art without departing from the technical idea of the present disclosure and thus the present disclosure is not limited by the above-described embodiments and the appended drawings.

REFERENCE NUMERALS

F: flange G: gasket
100: first sealing member
101, 102: sealing material 110: groove
150: filler
200: layer 300: second sealing member
400: outer ring 500: inner ring
600: O-ring
700: third sealing member 701: peak portion
702: valley portion
D1: first height D2: second height
D3: third height CF: planar part

INDUSTRIAL APPLICABILITY

According to the present disclosure, the airtightness of the inside of a pipe can be secured using a sealing member having a fish-bone shape.

According to the present disclosure, the airtightness and stability of the sealing member can be improved using a filler.

According to the present disclosure, the sealing member can be easily manufactured due to grooves formed in a sealing material.

In addition, according to the present disclosure, additional sealing may be provided using a second sealing member, thereby reducing an accident rate due to leakage.

The invention claimed is:

1. A gasket for maintaining airtightness in a pipe, comprising:

a first sealing member having a ring shape and formed by winding a belt-shaped scaling material; and a filler provided between overlapping portions of the wound sealing material, wherein a plurality of grooves engraved in a direction (C) perpendicular to a direction in which the sealing material is wound are formed in a continuous arrangement on one surface of the sealing member, and wherein the sealing material has a “)”-shaped cross section.

2. The gasket of claim 1, wherein the filler is formed of graphite.

3. The gasket of claim 1, further comprising two layers formed of graphite, one of the layers formed on an upper surface of the gasket and another of the layers formed on a lower surface of the gasket.

4. The gasket of claim 1, further comprising two layers formed of mica or polytetrafluoroethylene, one of the layers formed on an upper surface of the gasket and another of the layers formed on a lower surface of the gasket.

5. The gasket of claim 3, wherein a protruding pattern is formed on the upper surface or the lower surface of one of the two layers.

6. The gasket of claim 1, further comprising a second sealing member on an inner side of the first sealing member, wherein a sawtooth pattern is formed on an upper surface and a lower surface of the second sealing member.

7. The gasket of claim 1, further comprising an outer ring having a ring shape and provided on an outer side of the gasket.

8. The gasket of claim 1, further comprising an inner ring having a ring shape and provided on an inner side of the gasket.

9. The gasket of claim 6, wherein the first sealing member has a first height (D1), and the second sealing member has a second height (D2) lower than the first height (D1).

10. The gasket of claim 9, further comprising:

an outer ring having a ring shape and formed on an outer side of the gasket, wherein the outer ring has a third height (D3) lower than the second height (D2).

* * * * *